Nov. 20, 1928.  
G. DOLNE-DEHAN  
1,692,546  
ELECTROMECHANICAL STARTING DEVICE FOR HEAT ENGINES  
Filed Jan. 21, 1926

G. Dolne-Dehan  
INVENTOR

By: Marks & Clerk  
Att'ys

Patented Nov. 20, 1928.

1,692,546

UNITED STATES PATENT OFFICE.

GASTON DOLNE-DEHAN, OF JUAN LES PINS, FRANCE.

ELECTROMECHANICAL STARTING DEVICE FOR HEAT ENGINES.

Application filed January 21, 1926, Serial No. 82,829, and in Belgium January 21, 1925.

The invention relates to starting devices in which an electromotor operates as a driving gear, and then as generator when the heat engine is started. The object of the invention is to provide an improved device by means of which the said motor operates as a driving gear with a very great speed reduction, thus increasing correspondingly its output, and as generator, in direct drive with the shaft of the heat engine, which prevents the disadvantages of the transmission gears.

Figure 1:
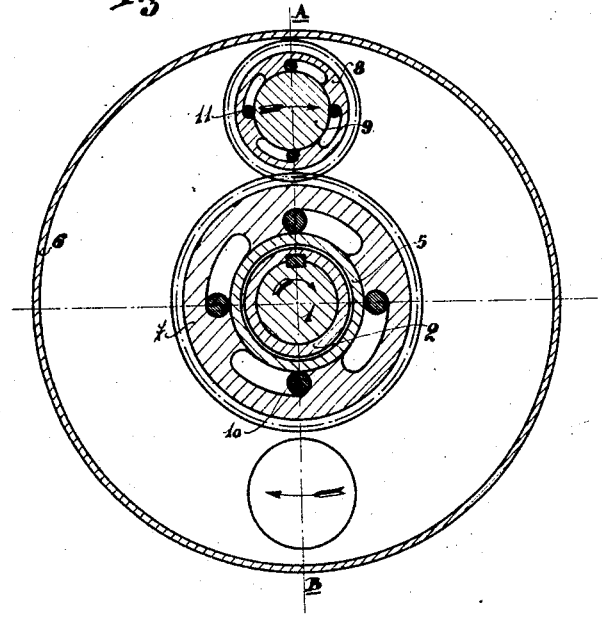
Figure 2:
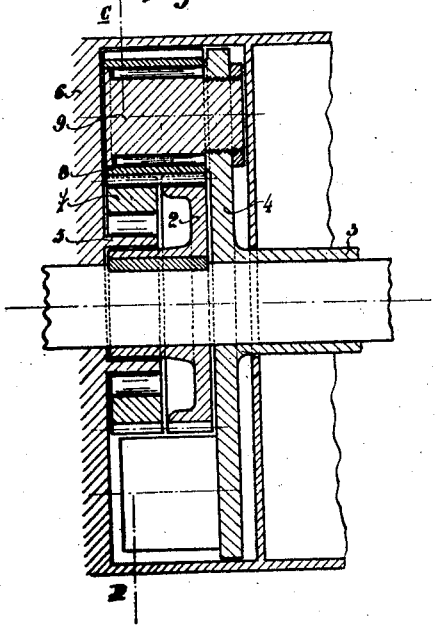

The invention also consists of the novel features of construction hereinafter described with application of the well known type of epicyclic planetary gearing and it is shown in the accompanying drawings in which:

Figure I is a transverse section through the shaft of the heat engine provided with the new starting device, and on the line C. D. of Fig. 2, which is a cross section on the line A. B. of Fig. I.

The shaft 1 of the heat engine is prolonged for receiving a keyed toothed wheel 2 and a sleeve 3 having a circular flange 4 and freely mounted on the shaft 1. On a hub 5 forming part of the engine casting 6 is freely mounted a toothed wheel 7 provided with the same correspondingly shaped teeth as the wheel 2, but having one tooth less. The flange 4 carries a pin 9 on which is freely mounted an epicyclic gear wheel 8 to gear with the two toothed wheels 2 and 7 at same time, so as to form a planetary differential gear. The armature (not shown) of the electric motor is keyed on the sleeve 3 and thus operates the flange 4 with its planet pinion 8.

A free-wheel device illustrated in the annexed drawings by means of rollers 10 and 11 permits the toothed wheels 7 and 8 to be rotated about their respective axles only in the direction of the arrows, and to be locked when they revolve in the contrary direction.

As hereinbefore described, it is a difference of one tooth between the respective number of teeth of the wheels 2 and 7, that permits the use of one single epicyclic gear wheel. According to the proposed applications, the number of the teeth and of the epicyclic gear wheels can be evidently modified, without departing from the scope of the invention.

The operation of the starting device is as follows:—When the current is supplied to the electromotor, or other electric organ, as the toothed wheel 2 is being held stationary by the effect of the resistances of the heat engine, the rotation of the flange 4 and the planet pinion 8 causes the reverse rotation of the toothed wheel 7, (the latter having, as before noticed, one tooth less than the wheel 2), till the wheel 7 is fastened on its hub 5 through the medium of the free wheel rollers 10. The electromotor is thus started practically on no load.

The locking of the wheel 7, which takes place gradually causes the planet pinion 8, which continues to turn, to produce the direct rotation of the toothed wheel 2 and thus the starting of the heat engine, to which it is connected. This impulse on the pinion 8 is made, by way of example, with a reduction of "fifty" if the teeth number of the wheels 2 and 7 is respectively "fifty one" and "fifty".

When the heat engine has been started, its speed soon exceeds that of the flange 4 (the electromotor of which is cut out, its function being finished) the toothed wheel 2 operates the planet pinion 8 in a direction opposite that of the arrows, which causes the locking of the planet pinion 8 on its pin 9 by means of the rollers 11 and the free motion of the wheel 7, which follows the rotational movement of the whole mechanism, the same being rigidly attached to the shaft 1, consequently to the key of the toothed wheels and the planet pinion. The electromotor is thus in direct drive with the shaft 1 and by means of suitable connections it can be switched to function as a generator, such construction being well known.

The main technical advantages of this electro-mechanical starting-device, owing to the great possible reduction, are that the output of the electromotor can be considerably reduced, resulting in a very sensible reduction of the weight, price and dimensions of the said motor and of the storage battery.

Since the electrical output starts on no load and the locking of the planet pinion 8 is progressive, its collector is not injured by a rapid flow of current, which marks the traces of the brushes on the commutator segments. Furthermore, the electrical output is not submitted to a sudden rush, owing to the progressive action of the locking and of the drop of the required amperage. Furthermore the mechanical organs in movement are always in direct drive and can only work in the condition for which they are calculated.

Having thus fully described my invention, what I claim and desire to secure by Letters Patent is:

1. In a transmission mechanism for a heat engine, a toothed gear secured to the shaft of said engine, a second toothed gear disposed axially to said first gear and rotatable with respect thereto, a sleeve freely mounted on said shaft and provided with an annular flange, and a planet gear freely mounted on said flange and engaging both of said toothed gears, said second gear and said planet gear being provided with free wheel clutches, one of said clutches locking said second gear when said sleeve is driving said engine, the other of said clutches locking said planet gear when the engine is running to drive said sleeve, whereby there is no longitudinal displacement of the members upon transmission from one position to the other.

2. In a transmission mechanism of the class described for a heat engine, a toothed gear secured to the shaft of said engine, a second toothed gear disposed axially to said first gear and rotatable with respect thereto, a housing secured to the frame of said engine, a bearing for said second gear secured to said housing, a sleeve freely mounted on said shaft and provided with an annular flange, and a planet gear freely mounted on said flange and engaging both of said toothed gears, said second gear and said planet gear being provided with free wheel clutches, one of said clutches locking said second gear to said housing when said sleeve is driving said engine, the other of said clutches locking said planet gear when the engine is running to drive said sleeve.

In testimony that I claim the foregoing as my invention, I have signed my name.

GASTON DOLNE-DEHAN.